(12) United States Patent
Yu

(10) Patent No.: US 8,766,502 B2
(45) Date of Patent: Jul. 1, 2014

(54) ROTOR HAVING SHAFT SLIP INHIBITION STRUCTURE AND MOTOR HAVING THE SAME

(75) Inventor: Byeongjong Yu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 192 days.

(21) Appl. No.: 13/483,469

(22) Filed: May 30, 2012

(65) Prior Publication Data

US 2013/0076163 A1   Mar. 28, 2013

(30) Foreign Application Priority Data

Sep. 27, 2011   (KR) .................. 10-2011-0097478

(51) Int. Cl.
*H02K 21/12*   (2006.01)
(52) U.S. Cl.
USPC .............................. 310/156.09; 310/216.86
(58) Field of Classification Search
USPC .............. 310/156.08–156.14, 216.81–216.86
See application file for complete search history.

(56) References Cited

U.S. PATENT DOCUMENTS

| | | | | |
|---|---|---|---|---|
| 5,302,876 A | * | 4/1994 | Iwamatsu et al. | 310/156.12 |
| 5,760,520 A | * | 6/1998 | Hasebe et al. | 310/156.19 |
| 7,057,322 B2 | * | 6/2006 | Araki et al. | 310/156.53 |
| 7,098,569 B2 | | 8/2006 | Ong et al. | |
| 7,948,133 B2 | * | 5/2011 | Fu | 310/156.09 |
| 2003/0048024 A1 | * | 3/2003 | Chu | 310/216 |
| 2005/0104468 A1 | * | 5/2005 | Araki et al. | 310/156.53 |
| 2012/0007464 A1 | * | 1/2012 | Saito et al. | 310/216.051 |
| 2012/0206007 A1 | * | 8/2012 | Kitagawa et al. | 310/156.08 |

FOREIGN PATENT DOCUMENTS

| | | |
|---|---|---|
| JP | S6096961 U | 7/1985 |
| JP | 2007-181270 A | 7/2007 |
| JP | 2009-517989 A | 4/2009 |

OTHER PUBLICATIONS

Office Action dated Jul. 20, 2012 in Korean Application No. 10-2011-0097478, filed Sep. 27, 2011.
Office Action dated Feb. 25, 2014 in Japanese Application No. 2012-202383.

* cited by examiner

*Primary Examiner* — Thanh Lam
(74) *Attorney, Agent, or Firm* — Saliwanchik, Lloyd & Eisenschenk

(57) ABSTRACT

A motor is disclosed, the motor including a stator core formed with a cylindrical space at an inner surface and formed at an inner circumferential surface with a plurality of teeth protruding toward a center, a cylindrical rotor rotatably mounted at the space and formed with a plurality of pockets for inserting a permanent magnet, a rotation shaft coupled to the center of the rotor and receiving a rotation force generated by interaction between the stator core and the rotor, a nut member connecting the rotor to the rotation shaft by press-fitting the rotor at a periphery to an axial direction of the rotation shaft and press-fitting the rotation shaft at an inner circumferential surface to the axial direction of the rotation shaft, and a key unit inhibiting a slip between the rotor and the nut member.

10 Claims, 3 Drawing Sheets

ROTOR HAVING SHAFT SLIP INHIBITION STRUCTURE AND MOTOR HAVING THE SAME

CROSS-REFERENCE TO RELATED APPLICATION

This application claims the benefit under 35 U.S.C. §119 of Korean Patent Application No. 10-2011-0097478, filed Sep. 27, 2011, which is hereby incorporated by reference in its entirety.

BACKGROUND

This section provides background information related to the present disclosure which is not necessarily prior art.

The present disclosure relates to a motor having a rotor provided with a shaft slip inhibition structure.

Generally, a motor is provided with a rotor and a stator to obtain a turning effect in response to an electromagnetic interaction between a permanent magnet and an electromagnet. The stator is secured at a motor housing, the rotor is rotatably mounted at a center of the stator, and a rotation force is generated by the interaction between the rotor and the stator.

At this time, the stator may be an electromagnet, and the rotor may be an electromagnet. Generally, an electromagnet is formed by winding a coil on the stator fixedly secured to an inner side of a rotor housing, and the rotor, which is a rotating member, is mounted with a permanent magnet.

The rotor is centrally press-fitted by a rotation shaft to output a rotation force of the rotation shaft of the rotor that is rotated by electromagnetic interaction with the stator. At this time, in a case the rotor is insertedly coupled by the rotation shaft, there may be generated a slip between the rotor and the rotation shaft.

As a technology to inhibit a slip on a rotation member such as a rotor, Korean Utility Model Registration No. 0149129 (Registered on Mar. 23, 1999) discloses a configuration in which a key and a key groove between an impeller and a rotation shaft.

However, in a case the rotation shaft and a rotation member are connected by a key coupling, a slip phenomenon generated by rotation may be inhibited, but damages may be brought on a rotor during a press-fitting process between the rotation shaft and the rotation member.

Particularly, in case of a part like a small rotor that has a relatively lower material strength, a part deformation including a twist may be generated on the rotor in the course of press-fitting of the rotor to generate an interference with a stator core or a defective performance.

It is, therefore, desirable to overcome the above problems and others by providing an improved motor.

BRIEF SUMMARY

This section provides a general summary of the disclosure, and is not a comprehensive disclosure of its full scope or all of its features.

The present disclosure is to provide a motor having a rotor provided with a shaft slip inhibition structure configured to inhibit a slip during a rotation operation between a rotor and a rotation shaft, and to minimize a rotor deformation during an assembly process.

Exemplary embodiments may, however, be implemented in many different forms and should not be construed as being limited to the embodiments set forth herein; Other features and advantages of the disclosed embodiments will be or will become apparent to one of ordinary skill in the art upon examination of the following figures and detailed description.

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

According to one aspect of the present disclosure, the object described above may be achieved by a motor which comprises: a stator core formed with a cylindrical space at an inner surface and formed at an inner circumferential surface with a plurality of teeth protruding toward a center; a cylindrical rotor rotatably mounted at the space and formed with a plurality of pockets for inserting a permanent magnet; a rotation shaft coupled to the center of the rotor and receiving a rotation force generated by interaction between the stator core and the rotor; a nut member connecting the rotor to the rotation shaft by press-fitting the rotor at a periphery to an axial direction of the rotation shaft and press-fitting the rotation shaft at an inner circumferential surface to the axial direction of the rotation shaft; and a key unit inhibiting a slip between the rotor and the nut member.

In some exemplary embodiments of the present disclosure, the key unit includes at least one key protrusively formed on the periphery of the rotor, and a concave key groove formed in a complementary shape with the key at a position opposite to that of the key of the nut member.

In some exemplary embodiments of the present disclosure, each of the key and the key groove is arranged in a plural number, each at a predetermined space.

In some exemplary embodiments of the present disclosure, the two keys and the two key grooves are symmetrically formed each spaced at a 180 degree.

In some exemplary embodiments of the present disclosure, the key and the key groove are surface-contacted at surfaces where centrifugal force is reacted in response to rotation of the rotor.

In some exemplary embodiments of the present disclosure, a cross-section at a distal end of the protruded key and a cross-section at a distal end of the key groove are distanced at a predetermined space.

In some exemplary embodiments of the present disclosure, a discrete distance between a cross-section of a protruding distal end of the key and a surface opposite to the cross-section of a distal end of the key groove is less than 0.2 mm.

In some exemplary embodiments of the present disclosure, each of the key and the key groove takes a shape of a quadrangular cross-section.

In some exemplary embodiments of the present disclosure, rotor includes pockets accommodating a plurality of permanent magnets, each pocket arranged at an equidistant space on a position proximate to the tooth.

In some exemplary embodiments of the present disclosure, the rotor is integrally injection-molded with the key using a synthetic resin material.

The motor according to the present disclosure has an advantageous effect in that a rotor and a nut are assembled by a key coupling and the nut is in turn press-fitted into a rotation shaft to inhibit generation of slip during rotation operation and to minimize damage to the rotor during press-fitting process, whereby productivity and processing performance of motor can be enhanced.

Another advantage is that a rotor deformation is minimized to inhibit an operational damage to a stator core and the rotor after assembly.

BRIEF DESCRIPTION OF DRAWINGS

Non-limiting and non-exhaustive embodiments of the present disclosure are described with reference to the following drawings, in which.

DETAILED DESCRIPTION

Figure 1:
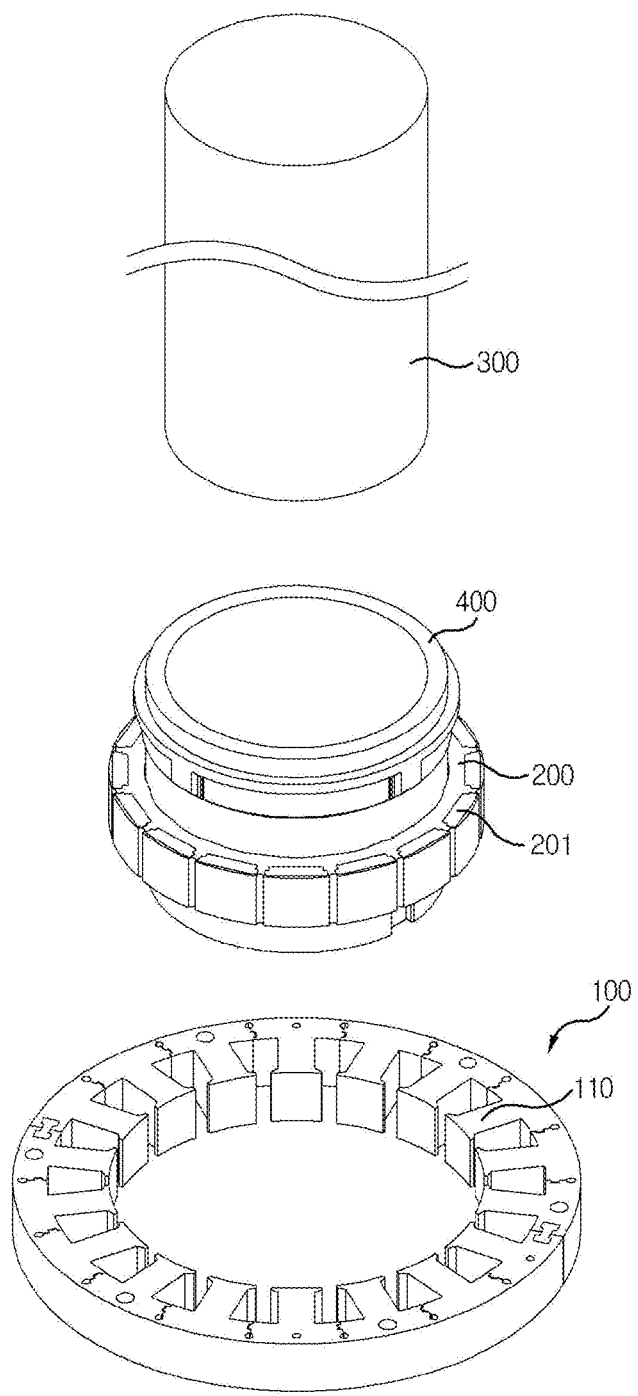
FIG. 1 is a perspective view illustrating a stator and a rotor of a motor according to an exemplary embodiment of the present disclosure.
Figure 2:
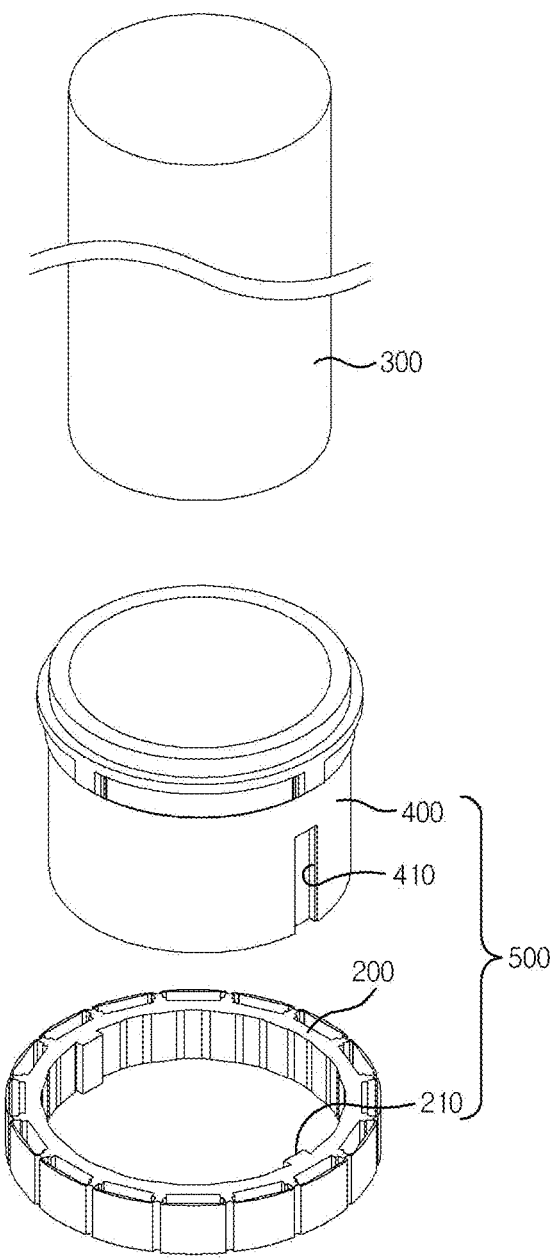
FIG. 2 is an exploded perspective view of FIG. 1.
Figure 3:
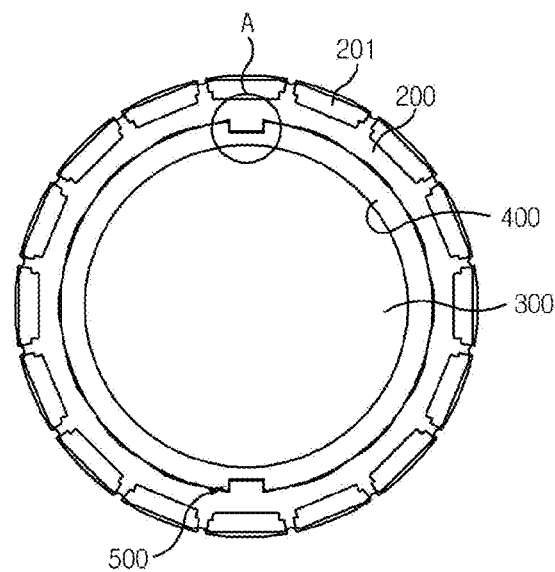
FIG. 3 is a plan view illustrating a coupled state of a rotor, a nut member and a rotation shaft according of a spindle motor according to an exemplary embodiment of the present disclosure.
Figure 4:
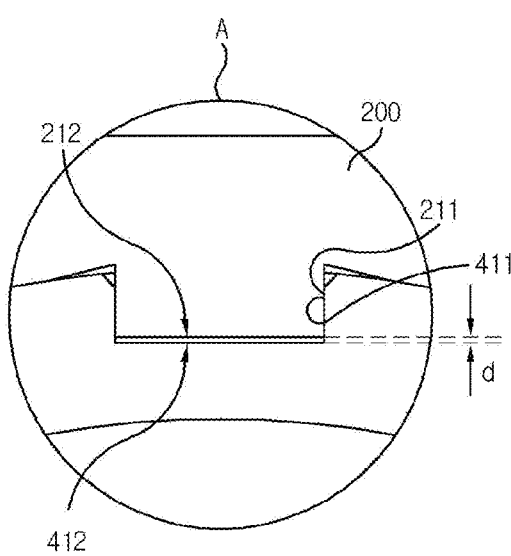
FIG. 4 is an enlarged view of an 'A' part of FIG. 3 according to an exemplary embodiment of the present disclosure.

FIG. 1 is a perspective view illustrating a stator and a rotor of a motor according to an exemplary embodiment of the present disclosure, FIG. 2 is an exploded perspective view of FIG. 1, FIG. 3 is a plan view illustrating a coupled state of a rotor, a nut member and a rotation shaft according of a spindle motor according to an exemplary embodiment of the present disclosure, and FIG. 4 is an enlarged view of an 'A' part of FIG. 3 according to an exemplary embodiment of the present disclosure.

As illustrated in FIGS. 1 to 4, a motor according to an exemplary embodiment of the present disclosure includes a stator core 100, a rotor 200, a rotation shaft 300 and a nut member 400.

Now, referring to FIGS. 1 and 2, the stator core 100 includes a cylindrical space thereinside, and a plurality of teeth 110 is protrusively formed at an inner circumferential surface toward a center of the stator core 100. The stator core 100 may be formed in one body, or each of the teeth may be manufactured in a split core and the teeth in split cores may be assembled in a cylindrical shape. Alternatively, the stator core 100 may be molded on a straight line, and folded in a round shape, where both distal ends are fixed.

The rotor 200 is rotatably mounted at the space centrally formed at the stator core 100, and a permanent magnet 201 is insertedly coupled at a position proximate to the tooth 110 to allow the rotor 200 to rotate in response to an electromagnetic interaction with a stator formed in an electromagnet in response to an electromagnetic force of a coil (not shown) wound on the tooth 110.

The rotor 200 is integrally formed with a plurality of pockets each having a size and a shape corresponding to those of the permanent magnet 201 for insertion of the permanent magnet 201, where the pockets are arranged at a position proximate to the teeth 110 of the rotor 200.

The rotor 200 may be variably manufactured, and according to an exemplary embodiment of the present disclosure, it is preferable that the rotor 200 be injection-molded in a cylindrical shape and with a synthetic resin material, using a metallic mold. The rotation shaft 300 is insertedly coupled to a center of the rotor 200 and receives a turning effect of the rotor 200 rotating in response to the interaction with the stator core 100. The nut member 400 is interposed between the rotor 200 and the rotation shaft 300 to connect the rotor 200 to the rotation shaft 300.

According to an exemplary embodiment of the present disclosure, the rotor 200 is press-fitted to an axial direction at a periphery of the nut member 400 and the rotation shaft 300 is press-fitted to an axial direction of the rotation shaft at an inner circumferential surface of the nut member 400.

A key unit 500 serves to inhibit a slip between the rotor 200 and the nut member 400, and, as illustrated in FIG. 2, includes a key 210 and a key groove 410, configured in a complementary shape.

A plurality of keys 210 and key grooves 410 is preferably arranged each at a predetermined space, and according to an exemplary embodiment of the present disclosure, it is preferable that two keys 210 and two key grooves 410 be symmetrically arranged each at a 180-degree space.

Meanwhile, although not illustrated in the drawings, it is preferable that at least or more keys 210 and key grooves 410 be formed, and it is possible to arrange three or more keys 210 and key grooves 410 may be arranged each at a predetermined space.

Referring to FIG. 4, the key 210 and the key groove 410 are such that a key lateral surface 211 and a key groove lateral surface 411 are surface-contacted to which a centrifugal force is reacted in response to rotation of the rotor 200, and a discrete distance (d) between a cross-section 212 of a protruding distal end of the key 210 and a surface 412 opposite to the cross-section 212 of a distal end of the key groove 410 is preferably distanced at a predetermined distance (d), and the discrete distance (d) between a cross-section 212 of a protruding distal end of the key 210 and a surface 412 opposite to the cross-section 212 of a distal end of the key groove 410 is preferably less than 0.2 mm.

Furthermore, each of the key 210 and the key groove 410 preferably takes a shape of a quadrangular cross-section, but the shape is not limited to the quadrangular cross-section and any type of shape may be applied including a triangular shape, a semi-circular shape or a polygonal shape as long as the key 210 and the key groove take a complementary concave and convex shape.

As apparent from the foregoing, the motor according to the present disclosure has an industrial applicability in that the rotor 200 and the nut member 400 do not idle during rotation, even if the press-fitting is not performed with a very small tolerance between the rotor 200 and the nut member 400 to inhibit the slip phenomenon, whereby a relatively small press-fitting force can be applied during the press-fitting process to inhibit parts from being deformed by excessive force during assembly process.

Another industrial applicability is that parts that are applied with force through the press-fitting process are not all the surfaces of the key 210 and the key groove 410, but the key lateral surface 211 and the key groove lateral surface 411 applied by the centrifugal force caused by rotation of the rotor 200, whereby the slip phenomenon generated during rotation operation can be inhibited even if the rotor 200 is not unnecessarily deformed during the press-fitting process.

Any reference in this specification to "one embodiment", "an embodiment", "exemplary embodiment", etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments. As may be used herein, the singular forms "a", "an" and "the" are intended to include the plural forms as well, unless the context clearly indicates otherwise. As may be used herein, the terms "substantially" and "approximately" provide an industry-accepted tolerance for its corresponding term and/or relativity between items.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A motor comprising:
   a stator core formed with a cylindrical space at an inner surface and formed at an inner circumferential surface with a plurality of teeth protruding toward a center;
   a cylindrical rotor rotatably mounted at the space and formed with a plurality of pockets for inserting a permanent magnet;
   a rotation shaft coupled to the center of the rotor and receiving a rotation force generated by interaction between the stator core and the rotor;
   a nut member connecting the rotor to the rotation shaft by press-fitting the rotor at a periphery to an axial direction of the rotation shaft and press-fitting the rotation shaft at an inner circumferential surface to the axial direction of the rotation shaft; and
   a key unit inhibiting a slip between the rotor and the nut member.

2. The motor of claim 1, wherein the key unit includes at least one key protrusively formed on the periphery of the rotor, and a concave key groove formed in a complementary shape with the key at a position opposite to that of the key of the nut member.

3. The motor of claim 2, wherein each of the key and the key groove is arranged in a plural number, each at a predetermined space.

4. The motor of claim 2, wherein the two keys and the two key grooves are symmetrically formed each spaced at a 180 degree.

5. The motor of claim 2, wherein the key and the key groove are surface-contacted at surfaces where centrifugal force is reacted in response to rotation of the rotor.

6. The motor of claim 2, wherein a cross-section at a distal end of the protruded key and a cross-section at a distal end of the key groove are distanced at a predetermined space.

7. The motor of claim 6, wherein a discrete distance between a cross-section of a protruding distal end of the key and a surface opposite to the cross-section of a distal end of the key groove is less than 0.2 mm.

8. The motor of claim 2, wherein each of the key and the key groove takes a shape of a quadrangular cross-section.

9. The motor of claim 1, wherein the rotor includes pockets accommodating a plurality of permanent magnets, each pocket arranged at an equidistant space on a position proximate to the tooth.

10. The motor of claim 2, wherein the rotor is integrally injection-molded with the key using a synthetic resin material.

* * * * *